(12) United States Patent
Couillaud et al.

(10) Patent No.: US 6,614,014 B2
(45) Date of Patent: Sep. 2, 2003

(54) METHOD FOR SELECTING THE OPERATION OF AN OPTICAL DETECTOR AND MULTIMODE OPTICAL DETECTOR

(75) Inventors: Frédéric Couillaud, Angouleme (FR); Alain Guillot, Fleac (FR); Jean-Pierre Laurent, La Bergerie (JP)

(73) Assignee: Schneider Electric Industries SA (FR)

( * ) Notice: Subject to any disclaimer, the term of this patent is extended or adjusted under 35 U.S.C. 154(b) by 70 days.

(21) Appl. No.: 09/995,601

(22) Filed: Nov. 29, 2001

(65) Prior Publication Data

US 2002/0066853 A1 Jun. 6, 2002

(30) Foreign Application Priority Data

Dec. 6, 2000 (FR) .............................. 00 15852

(51) Int. Cl.[7] .................. H01J 40/14; G01N 21/86; G08B 13/18
(52) U.S. Cl. ............. 250/221; 250/222.1; 250/559.12; 250/559.29; 340/555; 340/556
(58) Field of Search ................ 250/221, 222.1, 250/559.12, 559.4, 559.44, 559.29; 356/72, 73, 426, 427, 428, 430; 340/555, 556, 557

(56) References Cited

U.S. PATENT DOCUMENTS 4,331,868 A * 5/1982 Mash

| | | | |
|---|---|---|---|
| 4,879,461 A | 11/1989 | Philipp | 250/221 |
| 5,541,403 A | 7/1996 | Heinonen et al. | 250/221 |
| 5,808,296 A | * 9/1998 | McMonagle et al. | |
| 6,157,024 A | * 12/2000 | Chapdelaine et al. | |

FOREIGN PATENT DOCUMENTS

| EP | 0 923 140 | 6/1999 |
|---|---|---|
| FR | 2 792 732 | 10/2000 |

OTHER PUBLICATIONS

Inoue et al, US Pre–Grant Publication 2002/0195576 A1, Published Dec. 12, 2002.*

* cited by examiner

*Primary Examiner*—David Porta
*Assistant Examiner*—David C. Meyer
(74) *Attorney, Agent, or Firm*—Parkhurst & Wendel, L.L.P.

(57) ABSTRACT

Method for configuring the operating mode of an optical detector, by recognition, following an emission in a first operating mode M1, by means of the receiving system. The latter then confirms the detector in the first operating mode or switches it over into a second operating mode M2 according to whether there is recognition of the first mode. Automatic validation or validation carried out by the operator confirms the recognized operating mode.

Figure 1:
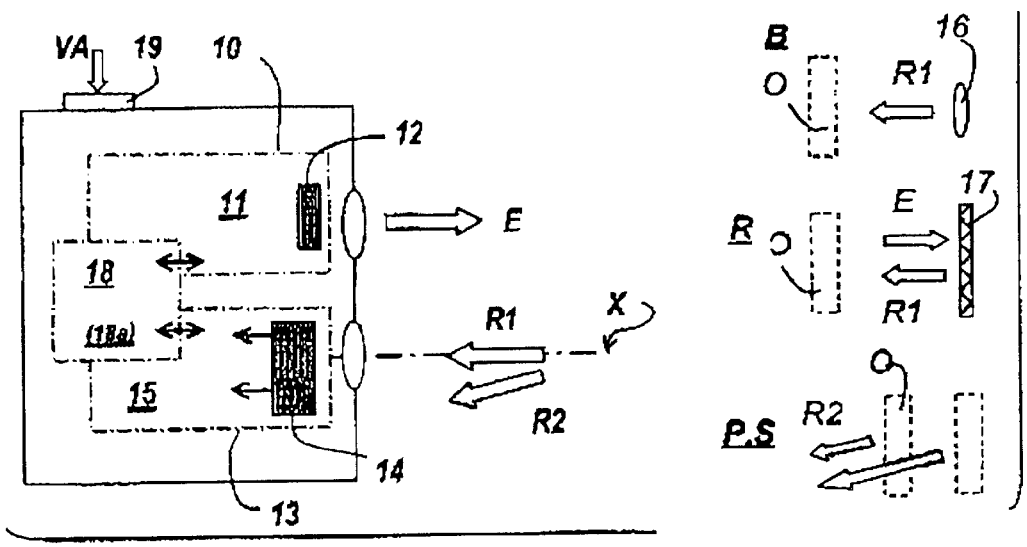

Application to multimode optical detectors able to operate in barrier, reflex, proximity, background suppression proximity mode.

10 Claims, 2 Drawing Sheets

METHOD FOR SELECTING THE OPERATION OF AN OPTICAL DETECTOR AND MULTIMODE OPTICAL DETECTOR

The present invention relates to a method for selecting the operation of an optical detector comprising an emitting system and a receiving system, the latter being provided with at least a photoreceptor component able to deliver a receipt signal significative of the presence or of the distance of an object on the path of an emitted beam.

Such optical detectors are well known. When they operate by detecting the interruption of an emitted light flux by the object to be detected, they belong to a first class of detectors: barrier, non-polarized reflex or polarized reflex detectors. It is important to note that subsequently, the term "reflex" will qualify both a non-polarized reflex detector and a polarized reflex detector. In the case of barrier operation, the detector does not comprise any emitting system and an external light source must be aligned with the axis of the photoreceptor component. In the case of reflex operation, the detector comprises an emitting system, the axis of which is next to that of the photoreceptor component, whereas a reflector must be aligned with the emission axis in order to send a reflected beam back to the component.

When optical detectors use diffused reflection of the beam transmitted by their emitting system on the object to be detected, they belong to a second class of cells either utilizing a measure of energy in a so-called "proximity" sub-class, or a measure of the displacement of the light spot received by the photoreceptor component, by a triangulation effect, in a so-called "background suppression proximity" sub-class.

EP 923 140 describes an optical cell provided with a unique photoreceptor component, configurable so as to be able to operate in reflex mode or in proximity mode, in response to voluntary selection. In certain cases, it is found desirable to obtain such a configuration semi-automatically or automatically.

The object of the invention is to enable an optical detector to operate in at least two operating modes selected from barrier, reflex, proximity, or background suppression proximity modes, by letting it place itself in the appropriate mode according to the environment which it sees.

According to the invention, the detector is configurable in order to be activated, either in a first operating mode with beam interruption of the barrier or reflex type, or in a second operating mode with diffused reflection of the proximity or background suppression proximity type, the detector is initially activated in the first operating mode (by its emitting system and its receiving system), and the receiving system performs a recognition of the first mode, and then the receiving system and optionally the emitting system of the detector, are confirmed in the first operating mode or switched over into the second operating mode according to whether there is recognition of the first mode. Confirmation in the first mode or switching over to the second mode, is dependent on a validation which may be automatic or preferably results from an operator maneuver. The detector is thus able to self-determine its operating mode sequentially.

When the detector has been configured in the second operating mode, it may be desired that it places itself in an appropriate sub-mode automatically. For this purpose, the receiving system measures the background distance and then according to the measured distance, puts itself into the "proximity" state (with determination of the energy of the received beam with respect to a threshold) or into the "background suppression proximity" state (with processing of the position of the received beam).

The invention also relates to a multimode optical detector comprising detection and configuration hardware and software means, able to generate the described configuration.

Description will be made of a non-limiting embodiment of the invention hereafter, with reference to the appended drawings.

FIG. 1 schematically illustrates a multimode optical detector and its different possibilities of use.

Figure 2:
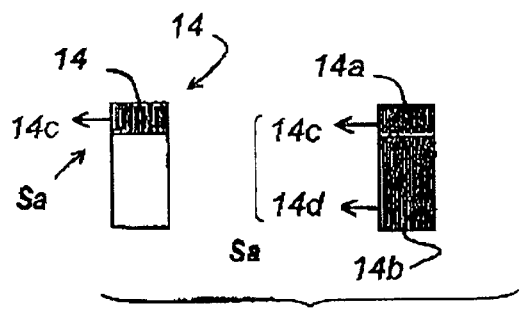

FIG. 2 schematically illustrates a component which may be used in the detector of FIG. 1, in two distinct operating modes.

Figure 3:
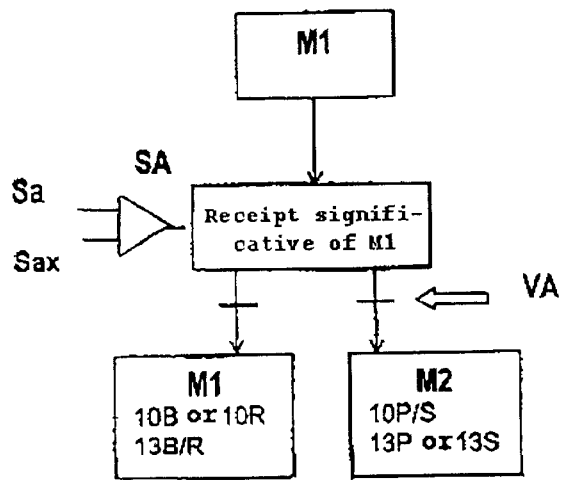

FIG. 3 schematically illustrates a diagram illustrating the method according to the invention.

Figure 4:
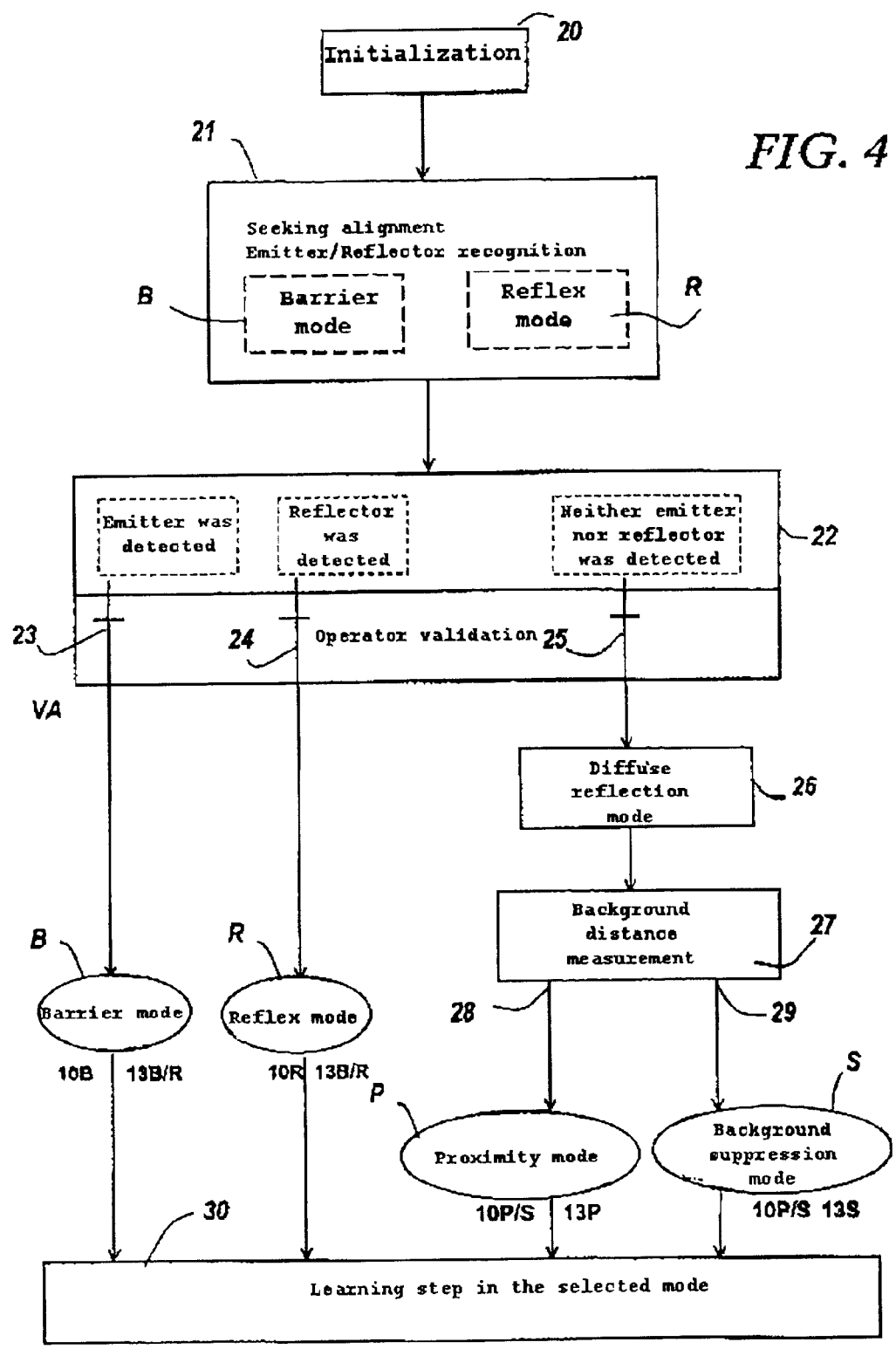

FIG. 4 is a flow chart illustrating the sequence of the method for implementing the detector according to the invention in a quadrimode embodiment.

The multimode optical detector of FIG. 1 comprises a emitting system 10 provided with an electronic circuit 11, associated software means and a photo-emitting unit 12 in order to emit an emission beam E. It also comprises a receiving system 13 for utilizing a received beam R1 or R2, provided with a photoreceptor unit 14 with axis X, with an electronic processing circuit 15 and associated software means.

Two operating modes implement a preliminary alignment operation: a barrier mode B, wherein beam R1 is derived from an external light source 16, with the proviso that this source is properly aligned, the beam being occulted when an object O is interposed on the receiving axis X. And a reflex mode R, wherein the beam R1 is derived from the internal light source formed by unit 12, after reflection on a reflector 17, with the proviso that this reflector is properly aligned. The beam is once again occulted there when an object is interposed on axis X, and circuit 15 switches an output of the detector according to this occultation.

Other operating modes do not require any alignment on a reflector or an emitter and they utilize the diffused reflection of light on the object, in a "proximity" mode P, or a "background suppression proximity" mode S. Object O sends back a beam R2 which produces a light spot on the component. In the proximity mode P, the electronic circuit 15 processes the spot intensity change in order to detect the object. In the background suppression proximity mode S, the inclination of the reflected beam is utilized in triangulation and it is the change in the spot's position on the photoreceptor unit 14 which is utilized.

The detector comprises detection and configuration software and hardware means 18 which are associated with the emitting 10 and receiving 13 systems.

On the one hand, means 18 configure the emitting system 10 according to the desired operating mode; no emission in barrier mode B (state 10B) as an external source is then active, emission in a first wavelength in reflex mode R (state 10R), emission in the first wavelength or in a second wavelength in proximity mode P or background suppression proximity mode S (state 10P/S). On the other hand, means 18 configure the receiving system 13 depending on the desired operating mode: state 13B/R in barrier mode B and reflex mode R, state 13P in proximity mode P and state 13S in background suppression proximity mode S.

In order to better understand the configuration of the receiving system 13, an example of a photoreceptor component 14 suitable for implementing the invention, is illustrated in FIG. 2. This component has two areas, one 14a is activated in barrier B and reflex R operating modes and the other one 14b activated in proximity P or background suppression proximity S operating modes. In the P and S modes, area 14a may also remain activated. The component may thus have several areas or output channels activated by circuit 15 depending on the selected mode and utilized by this circuit. As a component 14, two neighboring photoreceptor components may also be used, for example by juxtaposing two appropriate components, for example a photodiode for area 14a, activated in B or A mode and a PSD ("position sensing device") component for area 14b, activated in P or S mode. It should be reminded that a PDS component operates with amplification of its output quantities and comparison of amplified quantities.

The detection and configuration software and hardware means 18 comprise a microcontroller or any other logical unit able to process and evaluate the receiving signal Sa in order to generate through comparison with one or several thresholds Sax, a recognition signal, i.e. a signal SA significative of receipt corresponding to a first operating mode or not corresponding to this first mode. According to the state of the recognition signal, the microcontroller switches the receiving system 13, and optionally the emitting system 10 over to a state corresponding to the first or the second operating mode.

FIG. 3 explains the method. The emitting 10 and receiving system 13 of the detector are initially put into state 10B or 10R and 13B/R corresponding to the first operating mode M1 (B or R mode). The detection and configuration means 18 detect whether the level of the received signal Sa is greater than a threshold (receipt significative of the first mode) or lower than this threshold (receipt significative of the second mode), and then a validation action VA is performed either automatically and by using a timer means 18a, or preferably exerted by the operator by means of push-button 19. This action confirms the configuration of the detector in the first mode M1 if receipt is significative or switches the emitting system 10 of the detector over into the 10P/S state and the receiving system 13 into a 13P or 13S state corresponding to the second mode M2 (which may be mode P or mode S) if receipt is not significative. The selection made between state 13P and state 13S is described later on.

FIG. 4 illustrates an exemplary configuration sequence used for selecting the desired operating mode of an optical detector able to operate in four modes B, R, P, S. It is obvious that the sequence is simpler when it is desired to have the optical detector operate only in two or three modes: for example, only in reflex R and proximity P modes, or reflex R and background suppression proximity S modes, or even in reflex R/proximity P/background suppression proximity S modes.

Upon initialization 20, produced upon installing the detector or by a reset from the user, the detector enters into a step for seeking alignment 21. In this step, the emitting system 10 of the detector alternates between operating cycles in barrier mode B (state 10B: no emission) and in reflex mode R (state 10R: light emission by unit 12); during this time, the user aligns the detector with an external emitter 16 or reflector 17 if she/he wishes to implement mode B or R or does not align anything if she/he wishes to implement mode P or S. The alignment operation involves one or several light-emitting diodes visible on the case and connected with circuit 15. If, at the end of a few cycles, the receiving system 13 determines the presence of emitter 16 in response to its missing emissions or the presence of reflector 17 in response to its emissions, it pre-selects the detector in barrier mode B or in reflex mode R.

When, in a step 22, the user exerts a voluntary confirmation action VA, for example by means of a validation push-button 19, the emitting and receiving systems of the detector are locked at 23 in the barrier mode B or at 24 in the reflex mode according to the result of step 21. This action is exerted locally or remotely. If the receiving system 13 has not seen any emitter or reflector, the emission and receiving systems of the detector at 25, in response to the validation action VA proceed to a diffuse reflection operating step 26. Transitions 23, 24 and 25 are expressed by a configuration, appropriate to the selected mode, of the emitting system 10, for example with switching of the emission wavelength, and of the receiving system 13, by activating the photoreceptor areas or output channels of the component(s) 14.

In the diffuse reflection phase 26, in response to the emission of a beam of an appropriate wavelength, a measurement 27 of the background distance is performed by circuit 15. According to the result of the measurement, the receiving system 13 switches, at 28, the detector over into proximity P mode (state 13P: processing of the received energy with respect to a given threshold) or at 29 into background suppression proximity mode S (state 13S: processing of the position of the light spot on the photoreceptor component).

Typically, means 18 compare the received signal Sa with a high and a low threshold. In this way, if the background distance is located in a pre-determined range (for example, between 30 cm and 130 cm), the receiving system 13 is configured into the "background suppression proximity" state 13S and, if the background distance is located outside this range, the receiving system is configured in the "proximity" state 13P. According to the photoreceptor component (s) used in the receiving system 13, the configuration affects the receiving area 14a, 14d or the output channels 14c, 14d of this (these) component(s). When the configuration resulting from selection 28, 29 is achieved, the detector enters a learning step 30 which according to the current operating mode, informs it about the external transmitter, the reflector or the background.

It is obvious that variations may be brought to the described embodiments.

What is claimed is:

1. A method for configuring the operating mode of an optical detector, the detector comprising an emitting system and a receiving system, the detector being configurable in order to be activated, either in a first operating mode or in a second operating mode, characterized by the fact that:

the first operating mode (M1) is of the so-called barrier or reflex (B, R) type and the second operating mode (M2) is of the proximity or background suppression proximity (P, S) type the detector is initially activated in the first operating mode (M1), and the receiving system (13) of the detector performs a recognition (21) of the first mode, and then depending on the recognition, the receiving system of the detector is confirmed in a state (13B/R) specific to the first operating mode (M1) or switched over into a state (13P, 13S) specific to the second operating mode (M2).

2. The method according to claim 1, characterized by the fact that the detector is confirmed in the first operating mode (M1) or switched over into the second operating mode (M2) in response to a validation operation (VA).

3. The method according to claim 1, characterized by the fact that, depending on the recognition (21), the emitting system (10) of the detector is confirmed in a state (10B, 10R) specific to the first operating mode (M1) or switched over into a state (10P/S) specific to the second operating mode (M2).

4. The method according to claim 1, characterized by the fact that, during the recognition (21) of the emitter or reflector which is involved in the first operating mode (M1), the emitting system (10) oscillates from the barrier state (10B) to the reflex state (10R) by alternated activation and deactivation.

5. The configuration method according to claim 1, characterized by the fact that the second operating mode (M2) includes a step (27) for measuring the background distance, and then depending on the measured distance, the receiving system (13) is put into the proximity state (13P), with determination of the energy of the received beam, with respect to a threshold, or into the background suppression proximity state (13S), with processing of the position of the receiving beam.

6. A multimode optical detector comprising an emitting system (10) and a receiving system (13), the receiving system being provided with at least one photoreceptor component (14) and being able to deliver a received signal significative of the presence or of the distance of an object on the path of an emitted beam, the detector being capable of operating in a first operating mode (M1) or a second operating mode (M2), characterized by the fact that:

the first operating mode (M1) is of the barrier or reflex (B,R) type, and the second operating mode (M2) is of the proximity or background suppression proximity (P,S) type, the emitting system (10) and receiving system (13) being laid out in order to operate in either mode, the detector comprises detection and configuration hardware and software means (18) able to process the received signal (Sa), in order to consequently deliver a receipt signal (SA) significative of the recognition of an external emitter or of a reflector and, according to the state of the recognition signal, to confirm or switch the receiving system (13) into a state (13B/R) specific to the barrier or reflex (B,R) operating mode or into a state (13P,13S) specific to the proximity or background suppression proximity (P,S) operating mode, the detection and configuration means (18) comprise a validation means (18a,19) for the recognized operating mode.

7. The detector according to claim 6, characterized by the fact that the detection and configuration hardware and software means (18) switch, according to the state of the recognition signal (SA), the activated areas or output channels of the photoreceptor component(s) (14).

8. The detector according to claim 6, characterized by the fact that the detection and configuration hardware and software means (18) switch, according to the state of the recognition signal (SA), the wavelength of the emitting system (10) in the pre-selected operating mode (B,R) or (P,S).

9. The detector according to claim 6, characterized by the fact that validation means (19) is implemented by an operator.

10. The detector according to claim 6, characterized by the fact that the emitting system (10) alternately oscillates from the barrier mode to the reflex mode by alternate activation and deactivation.

* * * * *